(12) United States Patent
Chen et al.

(10) Patent No.: US 10,318,898 B2
(45) Date of Patent: Jun. 11, 2019

(54) DETERMINATION OF A PLACEMENT MODE OF AN OBJECT IN A MULTIPLICITY OF STORAGE AREAS

(71) Applicant: International Business Machines Corporation, Armonk, NY (US)

(72) Inventors: Junlei Chen, Shanghai (CN); Qun Tao Ding, Shanghai (CN); Yu Ping Gu, Shanghai (CN); Wei Huang, Shanghai (CN); Jiu Jiang, Shanghai (CN); Xue Ling Mi, Shanghai (CN); Ji Min Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 752 days.

(21) Appl. No.: 14/824,421

(22) Filed: Aug. 12, 2015

(65) Prior Publication Data
US 2016/0055432 A1    Feb. 25, 2016

(30) Foreign Application Priority Data
Aug. 21, 2014 (CN) .......................... 2014 1 0415064

(51) Int. Cl.
    *G06Q 10/06*      (2012.01)
    *G06Q 30/02*      (2012.01)

(52) U.S. Cl.
    CPC ..... *G06Q 10/0631* (2013.01); *G06Q 30/0242* (2013.01)

(58) Field of Classification Search
    CPC .................. G06Q 30/0242; G06Q 10/0631
See application file for complete search history.

(56) References Cited

U.S. PATENT DOCUMENTS

| | | | |
|---|---|---|---|
| 6,769,656 B1 | 8/2004 | Botkin et al. | |
| 7,734,495 B2 | 6/2010 | Klaubauf et al. | |
| 8,577,705 B1 * | 11/2013 | Baboo ................ | G06Q 30/02 705/7.11 |

(Continued)

OTHER PUBLICATIONS

Waters, Shari, "Creating Attractive Displays", provided in search report dated Jun. 5, 2014, 1 page, <http://retail.about.com/od/storedesign/a/create_display.htm>.

(Continued)

*Primary Examiner* — Sujay Koneru
(74) *Attorney, Agent, or Firm* — David B. Woycechowsky

(57) ABSTRACT

Machine logic (for example, software) for determining a placement mode of at least one kind of objects in a multiplicity of storage areas are disclosed. A placement method includes the following operations: determining attraction factors of the multiplicity of storage areas, an attraction factor of each storage area indicating a capability that the storage area attracts attention of a customer; determining a spatial elasticity factor of the at least one kind of objects, a spatial elasticity factor of each kind of objects indicating an impact of a change of the storage areas where the kind of objects are placed on an attention degree of the kind of objects; and determining the placement mode of the objects in the multiplicity of storage areas, at least according to the attraction factors of the multiplicity of storage areas and the spatial elasticity factor of the at least one kind of objects.

3 Claims, 2 Drawing Sheets

(56) References Cited

U.S. PATENT DOCUMENTS

| | | | |
|---|---|---|---|
| 2003/0055707 A1* | 3/2003 | Busche | G06Q 30/02 705/14.65 |
| 2003/0200129 A1* | 10/2003 | Klaubauf | G06Q 10/06315 705/7.25 |
| 2007/0288296 A1 | 12/2007 | Lewis | |
| 2008/0065468 A1* | 3/2008 | Berg | G06Q 30/02 705/7.32 |
| 2009/0240518 A1* | 9/2009 | Borom | G06Q 30/02 705/14.1 |
| 2010/0200657 A1 | 8/2010 | Morgan | |
| 2011/0288938 A1 | 11/2011 | Cook et al. | |
| 2013/0191193 A1* | 7/2013 | Calman | G06Q 30/00 705/14.4 |
| 2013/0275277 A1* | 10/2013 | Mihic | G06Q 10/06313 705/28 |
| 2015/0088703 A1* | 3/2015 | Yan | G06F 3/147 705/28 |
| 2015/0324635 A1* | 11/2015 | Tanaka | G06F 3/041 348/150 |
| 2016/0027029 A1* | 1/2016 | Poole | G06Q 30/0205 705/7.34 |

OTHER PUBLICATIONS

CN Patent Application No. 201410415064.8, entitled "Method and Apparatus for Determining a Placement Mode of an Object in a Plurality of Storage Areas", filed Aug. 21, 2014.

"Retail Displays & Store Fixtures—Countertop and Floor Standing Merchandising", provided in search report dated Jun. 5, 2014, <http://www.displays2go.com/C-1630/Retail-Displays-Store-Fixtures-Countertop-and-Floor-Standing-Merchandising>, 4 pages.

* cited by examiner

DETERMINATION OF A PLACEMENT MODE OF AN OBJECT IN A MULTIPLICITY OF STORAGE AREAS

BACKGROUND

The present disclosure relates to assortment and placement of physical object (for example, an item for sale in s store) within a physical storage space (for example, the shelves of the store), and more specifically, to determination of a placement mode for a multiplicity (that is, plurality) of physical objects.

Generally, there are many shelves in a store, and each shelf can include a multiplicity of fixtures for placing various physical objects to be purchased by customers. The placement mode of the objects on the shelves (for example, in which fixtures the objects are placed) may affect sale volumes of the objects. For example, for placement of items for sale within a given shelf and/or fixture can make it more likely that customers will notice an item for sale and thereby may lead to a greater sale volume when a given type of item is placed on a shelf and in a fixture near a customer's eyes as compared with when they are placed in fixtures near the customer's feet. In addition, there are typically many kinds of objects sold in the store. For a certain placement mode, although sale volumes of some objects decline, sale volumes of other objects increases, and as a result, a final revenue of the store increases; whereas for another placement mode, the situation is opposite. Therefore, it is necessary to properly determine the placement mode of the objects in the fixtures, for example, to determine in which fixtures the objects are placed, and corresponding numbers of the objects to be placed on a given shelf and/or in a given fixture.

Conventionally, a staff in the store determines the placement mode of various objects empirically.

SUMMARY

According to an aspect of the present invention, there is a method, computer program product and/or system that performs the following operations (not necessarily in the following order): (i) determining attraction factors respectively corresponding to a plurality of storage areas of a storage space, with each attraction factor indicating how strongly the corresponding storage area attracts attention of a customer; and (ii) determining the placement mode a first kind of objects in a first storage area of the plurality of storage areas based, at least in part, on the attraction factors of the plurality of storage areas.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
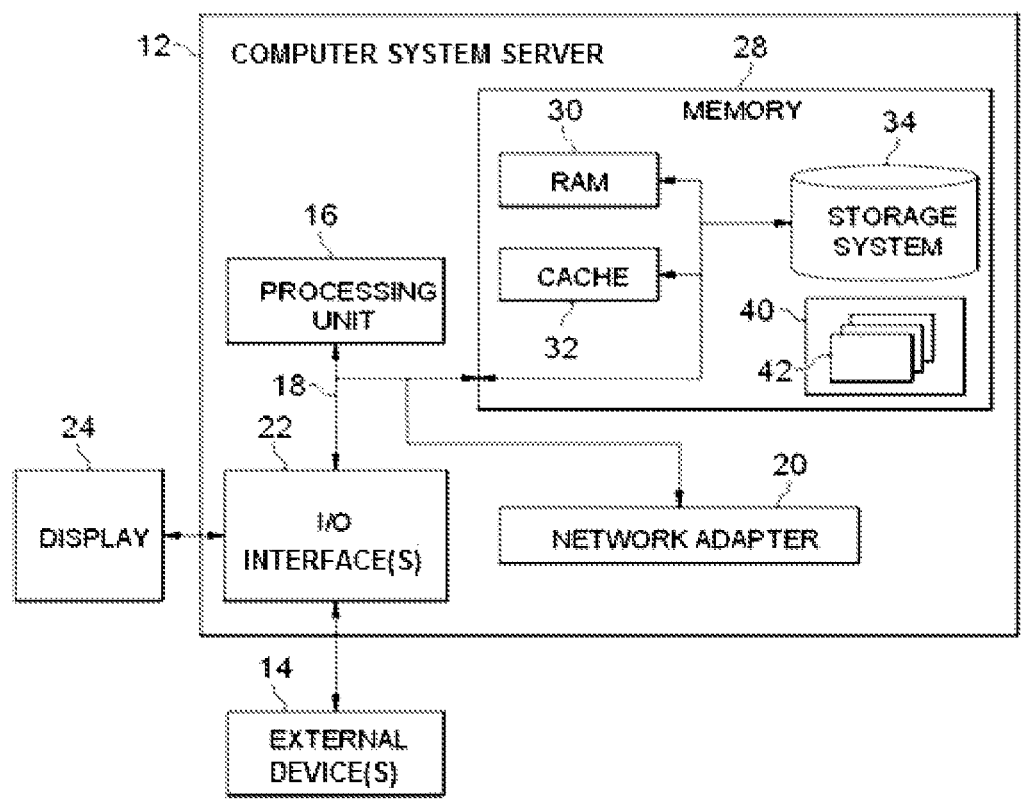
FIG. 1 shows computer system/server 12 which is applicable to implement the embodiments of the present invention.

Some embodiments of the present invention may recognize that conventional methods for placing physical objects in a storage space are typically: (i) entirely dependent on personal experience; (ii) not scientific; (iii) error prone especially for a staff who does not have much experience; (iv) can take very long time to determine the placement mode of the objects by using this method, which is low in efficiency; and/or (v) lead to an improper placement mode of the objects that reduces utilization efficiency of the fixtures and in turn affect the sale volumes of the objects.

Some embodiments of the present invention may: (i) scientifically analyze a relationship between the objects and the fixtures where the objects are placed; (ii) efficiently determine the proper placement mode of the objects in the fixtures; (iii) provide a method and an apparatus for determining a placement mode of at least one kind of objects in a multiplicity of storage areas; and/or (iv) scientifically and efficiently determine a proper placement mode of the objects in fixtures.

"Storage area" is hereby defined as any meaningful subset of the space in a storage space, without regard to whether the storage area is physically contiguous and/or unitary; a storage area may, or may not, be defined by hardware structures, such as shelves, racks and space dividers.

According to an aspect of the present disclosure, there is provided a method for determining a placement mode of at least one kind of objects in a multiplicity of storage areas, including the following operations (not necessarily in the following order): (i) determining attraction factors of the multiplicity of storage areas, an attraction factor of each storage area indicating a capability that the storage area attracts attention of a customer; (ii) determining a spatial elasticity factor of the at least one kind of objects, a spatial elasticity factor of each kind of objects indicating an impact of a change of the storage areas where the kind of objects are placed on an attention degree of the kind of objects; and (iii) determining the placement mode of the least one kind of objects in the multiplicity of storage areas, at least according to the attraction factors of the multiplicity of storage areas and the spatial elasticity factor of the at least one kind of objects.

According to another aspect of the present disclosure, there is provided an apparatus for determining a placement mode of at least one kind of objects in a multiplicity of storage areas, including: (i) an attraction factor determining device, configured to determine attraction factors of the multiplicity of storage areas, an attraction factor of each storage area indicating a capability that the storage area attracts attention of a customer; (ii) an elasticity factor determining device, configured to determine a spatial elasticity factor of the at least one kind of objects, a spatial elasticity factor of each kind of objects indicating an impact of a change of the storage areas where the kind of objects are placed on an attention degree of the kind of objects; and (iii) a placement mode determining device, configured to determine the placement mode of the at least one kind of objects in the multiplicity of storage areas, at least according to the attraction factors of the multiplicity of storage areas and the spatial elasticity factor of the at least one kind of objects.

Some embodiments according to the present disclosure can automatically determine the placement mode of the objects in the multiplicity of storage areas, based on a correlation between the multiplicity of storage areas (for example, the fixtures described above) and the attention degree of the objects as well as the impact of the change of placement positions of the objects on the attention degree of the objects, so as to determine the proper placement mode of the objects scientifically and efficiently, reduce a probability of making errors when determining the placement mode of the objects, and improve utilization efficiency of the storage areas.

Some embodiments will be described in more detail with reference to the accompanying drawings, in which some embodiment(s) of the present disclosure have been illustrated. However, the present disclosure can be implemented in various ways, and thus should not be construed to be limited to the embodiments disclosed herein. On the contrary, those embodiments are provided for the thorough and complete understanding of the present disclosure, and completely conveying the scope of the present disclosure to those skilled in the art.

Referring now to FIG. 1, in which computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (for example, a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (for example, at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (for example, network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (for example, the Internet) via network adapter 20. As depicted, network adapter 20 communicates with the other components of computer system/server 12 via bus 18. It is to be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

With reference now to the drawings, a method and an apparatus for determining a placement mode of at least one kind of objects in a multiplicity of storage areas according to embodiments of the present disclosure will be described below. The physical objects described herein may be various products or commodities. "Physical objects" is herein define to collectively include both: (i) physical objects as traditionally understood, and (ii) virtual representations of physical objects in a virtual environment.

The multiplicity of storage areas described herein may be located on one or more shelves, and can be used to place various objects. For example, a shelf may include one or more layers, each layer may be divided into one or more fixtures, and each fixture may have one or more objects placed therein so as to become a storage area. Of course, the storage area may also take other forms. For example, in a case where the layers of the shelf layer are not subdivided into the fixtures, the storage areas of the shelf may be the layers of the shelf. In the following description, the fixtures are taken as an example of the storage areas. Further, in the embodiments of the present disclosure, in a case where there are a multiplicity of shelves, position difference of the shelves will be reflected onto position difference of the fixtures of the shelves, and a number of the shelves will be reflected onto a number of the fixtures of the shelves. Thus, the placement mode of the objects on the shelves can be determined by determining the placement mode of the objects in the respective fixtures. For this reason, the number of the shelves does not affect implementation of the embodiments of the present disclosure. In other words, the embodiments of the present disclosure may be applicable to one or more shelves, therefore unless otherwise specifically described, the shelf/shelves described below may refer to one or more shelves. In addition, it is assumed hereinafter that there are M fixtures, and there are N kinds of objects to be placed, where M>1, and N≥1.

Furthermore, a concept of "attention degree" of an object is used in the embodiments of the present disclosure. The attention degree of the object indicates a degree that the object is paid attention to, and may also be called a popularity degree. The attention degree may have a variety of manifestation forms. For example, in a situation of a store, the attention degree of the object (for example, commodity) may be manifested as a sale volume of the objects, that is, the greater the attention degree of the object is, the greater the sale volume of the object is. As a further example, in a situation of a library, the attention degree of the object (for example, book) may be manifested as a lending rate (or lending amount) of the object, where the greater the attention degree of the object is, the higher the lending rate of the object is. Hereinafter, the embodiments of the present disclosure will be described with the sale volume being used as an example of the applicable proxy for "attention degree." It is to be appreciated that other factors may alternatively, or additionally, used to determine attention degree in any given embodiment of the present invention.

Figure 2:
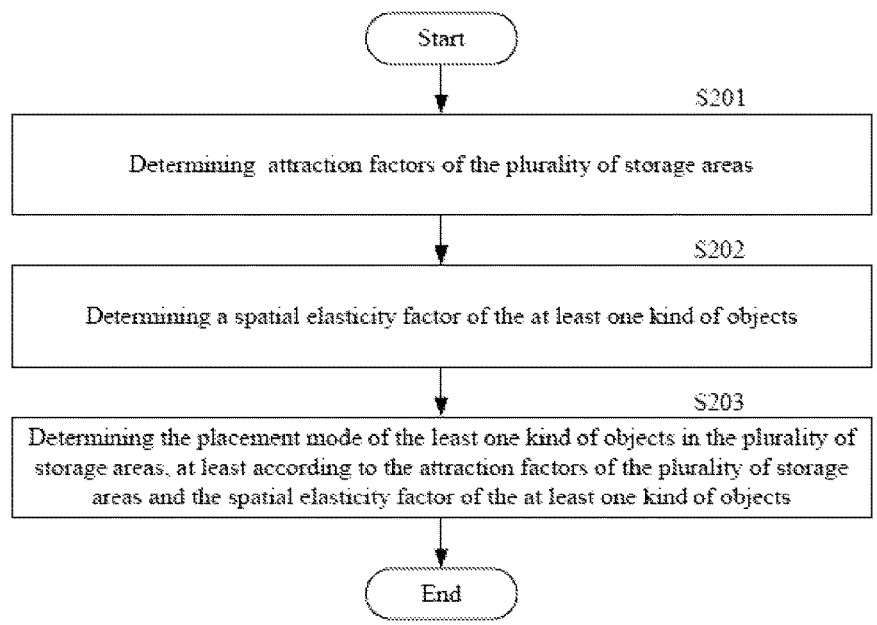
FIG. 2 is a flow chart of a method for determining a placement mode of at least one kind of objects in a multiplicity of storage areas according to an embodiment of the present disclosure.

With reference now to FIG. 2, the method for determining a placement mode of at least one kind of objects in the M storage areas according to the embodiment of the present disclosure will be described.

As shown in FIG. 2, in step S201, attraction factors of the M fixtures may be determined, an attraction factor of each fixture indicating a capability that the fixture attracts attention of a customer.

As described above, different fixtures have different capabilities of attracting the customer. For example, a fixtures located near eyes of the customer are easier to attract the attention of the customer than a fixture which is located near feet of the customer, and the capabilities that the fixtures attract the attention of the customer can affect the attention degrees (for example, the sale volumes) of the objects placed in the fixtures. Based on this fact, the attraction factors of the fixtures are used in the present embodiment to indicate the capabilities that the fixtures attract the attention of the customer. Further, because the attraction factors of the fixtures are directly related to the sale volumes of the objects placed in the fixtures, the attraction factors of the fixtures can be determined by historical sale volumes of the objects placed in the fixtures.

In an implementation for determining the attraction factors of the fixtures, the attraction factor of each fixture can be determined based on a historical sale volume of one kind of objects. For example, in a case where one kind of objects are placed in the M fixtures, a ratio between a historical sale volume of this kind of objects placed in each fixture and a total historical sale volume of this kind of objects placed in the M fixtures may be determined as the attraction factor of the fixture. That is to say, an attraction factor $AF_i$ of an ith ($1 \leq i \leq M$) fixture may be determined according to Equation (1) below:

$$AF_i = \frac{Vol_i}{\sum_{i=1}^{M} Vol_i} \quad (1)$$

where $Vol_i$ is a historical sale volume of this kind of objects placed in the ith fixture, and $$\sum_{i=1}^{M} Vol_i$$

is a total historical sale volume of this kind of objects placed in the M fixtures. It is to be noted that the "one kind of objects" described herein may be the same kind of objects as the N kinds of objects or a different kind of objects from the N kinds of objects, as long as the historical sale volume thereof can be obtained so as to determine the attraction factor in the above mode.

In another implementation for determining the attraction factors of the fixtures, the attraction factor of each fixture can be determined based on historical sale volumes of multiple kinds of objects (assumed to be $N_1$ kinds of objects for convenience of description, where $N_1 > 1$). For example, for each kind of objects in the $N_1$ kinds of objects, a ratio between a historical sale volume of this kind of objects placed in each fixture and a total historical sale volume of this kind of objects placed in the M fixtures in a case where this kind of objects are placed in the M fixtures may be determined as a partial attraction factor of the fixture. Then, the attraction factor of the fixture may be determined according to the partial attraction factors of each fixture determined for the $N_1$ kinds of objects. In the present embodiment, for example, a weighted average of the partial attraction factors of each fixture determined for the $N_1$ kinds of objects may be calculated as the attraction factor of the fixture, where weighting coefficients of the respective partial weighting factors of the fixture may be determined flexibly as needed and/or according to the kinds of the objects. Specifically, with respect to a jth ($1 \leq j \leq N_1$) kind of objects in the $N_1$ kinds of objects, a partial attraction factor $AF_{i,j}$ of the ith ($1 \leq i \leq M$) fixture may be determined according to Equation (2) below:

$$AF_{i,j} = \frac{Vol_{i,j}}{\sum_{i=1}^{M} Vol_{i,j}} \quad (2)$$

where $Vol_{i,j}$ is a historical sale volume of the jth kind of objects placed in the ith fixture, and $$\sum_{i=1}^{M} Vol_{i,j}$$

is a total historical sale volume of the jth kind of objects placed in the M fixtures. Then, the weighted average of the partial attraction factors of each fixture determined for the $N_1$ kinds of objects may be calculated by Equation (3) below, as the attraction factor of the ith fixture:

$$AF_i = \sum_{j=1}^{N} w_j AF_{i,j} \quad (3)$$

where $w_j$ is a weighting factor for the jth kind of objects, and $$\sum_{j=1}^{N_1} w_j = 1.$$

Of course, the attraction factor of the fixture may be determined in another manner, in addition to the weighted average, according to the partial attraction factors of each fixture determined for the $N_1$ kinds of objects. For example: (i) an average of the partial attraction factors of each fixture determined for the $N_1$ kinds of objects may be calculated as the attraction factor of the fixture, or (ii) a median of the partial attraction factors of each fixture determined for the $N_1$ kinds of objects may be used as the attraction factor of the fixture. It is to be noted that, the $N_1$ kinds of objects described herein may be the same, or different from, kinds of objects as the N kinds of objects. Further, in other embodiments, when a partial attraction factor determined for a certain kind of objects in the $N_1$ kinds of objects deviates greatly from partial attraction factors determined for the other kinds of objects in the $N_1$ kinds of objects, the partial attraction factor determined for the certain kind of objects may be excluded. In this way, the attraction factor of the fixture is determined based on only the partial attraction factors determined for the other kinds of objects in the above manner.

With reference further to FIG. 2, in step S202, spatial elasticity factors (SEFs) of the N kinds of objects may be determined, a spatial elasticity factor of each kind of objects indicating an impact of a change of the fixtures where the kind of objects are placed on an attention degree (for example, a sale volume) of the kind of objects.

Specifically, attraction factors of different fixtures may be different as described above, thus when the fixtures where the objects are placed are changed, the sale volume of the objects may change. However, a change amount of the sale volume of the objects is related to the objects per se, besides the change of the attraction factors of the fixtures, when the fixtures where the objects are placed are changed. For example, for a certain kind of objects, when they are moved from a fixture A (whose attraction factor is large to a fixture B whose attraction factor is small), a sale volume of the kind of objects may decrease significantly, whereas for another kind of objects, if they are moved from the fixture A to the fixture B, a sale volume of the kind of objects may experience little, or no, decrease. Therefore, in order to determine the proper placement mode of the objects in the multiplicity of fixtures, it is also necessary to determine the impact of the change of the fixtures where the kind of objects are placed on the sale volume of the kind of objects, that is, determine a correlation between the change of the positions where the kind of objects are placed and the change amount of the sale volume of the kind of objects. In the embodiment of the present disclosure, the correlation is indicated by the spatial elasticity factors.

In some embodiments of the present disclosure, for at least one combination in combinations (set to be P combinations for convenience of description, where P≥1) formed by any two of the M fixtures, a difference between attraction factors of two fixtures in the one combination and change amounts of historical sale volumes of the N kinds of objects when the N kinds of objects are moved between the two fixtures (that is, differences between the historical sale volumes of the N kinds of objects when they are placed in one of the two fixtures and the historical sale volumes of the N kinds of objects when they are placed in the other one of the two fixtures) may be determined, then the spatial elasticity factors of the N kinds of objects may be determined according to the differences between the attraction factors determined for the P combinations and the change amounts of the historical sale volumes. In the present embodiment, a slope of a straight line obtained by fitting the differences between the attraction factors determined for the P combinations and the change amounts of the historical sale volumes may be determined, as the special elasticity factors of the N kinds of objects. The fitting may be a least square fitting or other types of fitting.

Specifically, because each kind of objects can be moved between any two of the M fixtures, there are M*(M−1) possible combinations of the fixtures for each kind of objects, with each combination corresponding to a mode of movement of the kind of objects. The P combinations can be selected from the M*(M−1) possible combinations in accordance with a preset standard. For example, because it can be helpful to use the historical sale volumes of the objects placed in the fixtures during the calculation of the spatial elasticity factors, the P combinations of fixtures can be selected according to whether there have been the historical sale volumes of the objects placed in two fixtures in each combination. Then, for each kind of objects among the N kinds of objects, the difference between the attraction factors of two fixtures of each combination in the P combinations and the change amount of the historical sale volumes of the kind of objects when the kind of objects are moved between the two fixtures, that is, when the position where the kind of objects are placed is changed from one fixture of the each combination to the other fixture of the combination, can be calculated. In this way, P pairs of the differences between the attraction factors and the change amounts of the historical sale volumes can be obtained for each kind of objects. Here, the P pairs of the differences between the attraction factors and the change amounts of the historical sale volumes can be expressed as P data pairs ($\Delta AF_t$, $\Delta Vol_t$), t=1, 2, . . . , P, where: (i) $\Delta AF_t$ is the difference between the attraction factors obtained for a tth combination; and (ii)) $\Delta Vol_t$ is the change amount of the historical sale volumes obtained for the tth combination.

Subsequently, the P data pairs ($\Delta AF_t$, $\Delta Vol_t$) may be fitted (for example, least-square-fitted) to obtain a corresponding straight line, and a slope of the straight line is calculated as the spatial elasticity factor of the kind of objects. In this manner, the spatial elasticity factors of the N kinds of objects can be determined. Because the method for determining the straight line and the slope thereof by fitting the data pairs is commonly known in the art, a description thereof is omitted herein. It is to be appreciated that in step S202, in addition to fitting the above P data pairs ($\Delta AF_t$, $\Delta Vol_t$), data pairs derived from the differences between the attraction factors and the change amounts of the historical sale volumes determined for the P combinations may be fitted to obtain a corresponding straight line, and then a slope of the straight line may be calculated as the spatial elasticity factor of the kind of objects. For example, P data pairs $$\left(\frac{\Delta AF_t}{\Delta F_t}, \frac{\Delta Vol_t}{Vol_t}\right),$$

t=1, 2, . . . , P may be fitted to determine the spatial elasticity factor, where: (i) $AF_t$ is an attraction factor of a certain fixture of the tth combination; and (ii) $Vol_t$ is a historical sale volume when the kind of objects are placed in the certain fixture.

With reference further to FIG. 2, in step S203, the placement mode of the N kinds of objects in the M fixtures may be determined at least according to the attraction factors of the M fixtures and the spatial elasticity factors of the N kinds of objects. The determination of the placement mode of the N kinds of objects in the M fixtures may include, for example: (i) determination of the fixtures where the N kinds of objects are respectively placed; and/or (ii) numbers of the objects placed in the fixtures respectively.

Specifically, a regression analysis (for example a linear fitting) may be performed on historical data of objects placed in at least one of the M fixtures to determine a function relationship between parameters associated with the N kinds of objects and the attraction factors of the M fixtures, the spatial elasticity factors of the N kinds of objects and the number of the N kinds of objects placed in the at least one fixture. The parameters may be sale volumes (attention degrees) of the N kinds of objects, a revenue obtained by selling the N kinds of objects, a profit obtained by selling the N kinds of objects, or the like. The parameters can be selected according to an object of determining the placement mode of the objects. For example, if the object of determining the placement mode of the objects is to improve the profit of the store, then the profit may be used as the parameters.

For example, an expression representing a function relationship between a parameter associated with a jth ($1 \leq j \leq N$) kind of objects placed in the ith fixture and the attraction factor of the ith fixture, the spatial elasticity factor of the jth kind of objects and a number of the jth kind of objects placed in the ith fixture can be established as shown in Equation (4) below:

$$\text{Log}(\text{object}_{i,j}) = a \cdot AF_i + b \cdot SEF_j + c \cdot \text{facing}_{i,j} + d \quad (4)$$

Where: (i) $\text{object}_{i,j}$ denotes the parameter associated with the jth kind of objects placed in the ith fixture, such as a sale volume of the jth kind of objects placed in the ith fixture; (ii) a revenue obtained by selling the jth kind of objects placed in the ith fixture, a profit obtained by selling the jth kind of objects placed in the ith fixture, or the like; (iii) $AF_i$ denotes the attraction factor of the ith fixture; (iv) $SEF_j$ denotes the spatial elasticity factor of the jth kind of objects, (v) $\text{facing}_{i,j}$ denotes the number of the jth kind of objects placed in the ith fixture, and (vi) a, b, c, and d are constants. Then, the coefficients a, b, c and d in the above Equation (4) may be determined based on the historical data of each kind of objects among the N kinds of objects, and can be substituted into the above Equation (4) so as to determine the function relationship between the parameter associated with the jth kind of objects placed in the ith fixture and the attraction factor of the ith fixture, the spatial elasticity factor of the jth kind of objects and the number of the jth kind of objects placed in the ith fixture.

As an example, a linear fitting may be performed on the attraction factor of the ith fixture, the spatial elasticity factor of each kind of objects among the N kinds of objects, the historical number of each kind of objects placed in the ith fixture, and the historical sale volume of each kind of objects placed in the ith fixture, so as to determine the coefficients a, b, c, and d in the above Equation (4). As another example, one kind of objects may be selected from the N kinds of objects, and a linear fitting may be performed by using the attraction factors of the respective fixtures among the M fixtures, the spatial elasticity factor of the selected kind of objects, the historical numbers of the selected kind of objects placed in the respective fixtures, and the historical sale volumes of the selected kind of objects placed in the respective fixtures, so as to determine the coefficients a, b, c, and d in the above Equation (4). Since a specific method for fitting to determine the coefficients a, b, c, and d in the above Equation (4) is commonly known in the art, a description thereof is omitted here. Of course, it is possible not to use the linear fitting method, in which case four kinds of objects may be selected from the N kinds of objects, and then the attraction factor of the ith fixture, the spatial elasticity factor of each kind of objects among the four kinds of objects, the historical number of the each kind of objects placed in the ith fixture, and the historical sale volume of the each kind of objects placed in the ith fixture may be substituted into the above Equation (4) so as to obtain four expressions, and in turn the coefficients a, b, c, and d can be determined.

After the above function relationship is determined, the fixtures where the N kinds of objects are placed respectively and the numbers of the N kinds of objects placed in the fixtures may be determined. Specifically, the storage areas (fixtures) where the N kinds of objects are placed respectively and the numbers of the N kinds of objects placed in the storage areas respectively when the parameters associated with the N kinds of objects are maximum in a case where a constraint condition is satisfied may be determined according to the functional relationship.

For example, a sum $\text{object}_{sum}$ of the parameters associated with the N kinds of objects can be calculated as shown in Equation (5) below:

$$\text{object}_{sum} = \sum_{j=1}^{N} \sum_{i=1}^{M} e^{(a \cdot AF_i + b \cdot SEF_j + c \cdot \text{facing}_{i,j} + d)} \quad (5)$$

On the right side of the above Equation (5), when i and j have been determined, $\text{facing}_{i,j}$ is indeterminate. Thus all possible values of $\text{facing}_{i,j}$ can be traversed to calculate corresponding $\text{object}_{sum}$, and respective items on a right side of the above Equation (5) when $\text{object}_{sum}$ is maximum can be determined. Indexes (that is, i) of the respective attraction factors, indexes (that is, j) of the spatial elasticity factors of the respective kinds of objects and the corresponding values of $\text{facing}_{i,j}$, which are included in the respective items, can show which kind of objects are placed in which fixture and the numbers of the placed objects when $\text{object}_{sum}$ is maximum. This means that the placement mode of the N kinds of objects in the M fixtures when $\text{object}_{sum}$ is maximum can be determined as a final placement mode.

In the present embodiment, the possible values of $\text{facing}_{i,j}$ may be flexibly determined as required, but it is to be noted that when the possible values of $\text{facing}_{i,j}$ are determined, a certain constraint condition needs to be satisfied. The constraint condition may include one or more of a total number of each kind of objects to be placed, numbers of each kind of objects that can be accommodated by the respective fixtures, and a user-specified constraint condition. Specifically, because the total number of each kind of objects to be placed is known, the number of the kind of objects placed in each fixture should not exceed the total number, and a sum of the numbers of the kind of objects placed in all the fixtures should be equal to the total number. Further, because the number of each kind of objects that can be accommodated by one fixture is limited, the number of each kind of objects placed in one fixture should not exceed a maximum number of the kind of objects that can be accommodated by the fixture. In addition to the above constraint conditions, the user may specify other constraint condition(s) as may be appropriate in a given object placement context. For example, the user can specify a maximum number of a certain kind of objects placed in each fixture.

Thus, with the above method according to the embodiment of the present disclosure, the placement mode of the objects in the multiplicity of fixtures can be automatically determined based on a correlation between the multiplicity of fixtures and the attention degrees (for example, sale volumes) of the objects as well as the impact of the change of the positions for placing the objects on the attention degrees of the objects, so as to determine the proper placement mode of the objects scientifically and efficiently, reduce a probability of making errors when the placement mode of the objects is determined, and improve utilization efficiency of the storage areas.

The respective embodiments for implementing the method of the present disclosure have been described with reference to the accompanying drawings hereinbefore. Those skilled in the art may understand that the above method may be implemented in software, in hardware, or in a combination thereof. Further, those skilled in the art may understand that by implementing the respective steps in the above method in software, in hardware, or in a combination thereof, an apparatus for determining a placement mode of at least one kind of objects in a multiplicity of storage areas based on the same inventive concept may be provided. Even if a hardware configuration of the apparatus is the same as that of a general-purpose processing apparatus, the apparatus will exhibit characteristics different from the general-purpose processing apparatus due to a function of software contained therein, so as to form the apparatus according to the embodiment of the present disclosure. The apparatus of the present disclosure includes a multiplicity of units or modules, which are configured to execute corresponding steps. Those skilled in the art may understand how to write a program to implement actions of the units or modules by reading the present specification.

Figure 3:
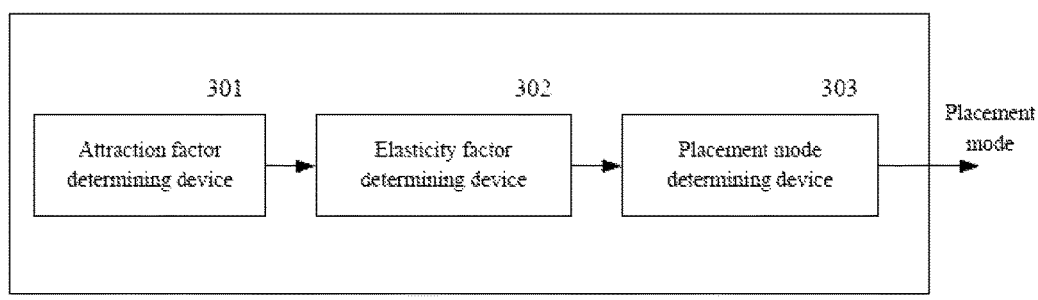
FIG. 3 is a block diagram of an apparatus for determining a placement mode of at least one kind of objects in a multiplicity of storage areas according to an embodiment of the present disclosure.

With reference now to FIG. 3, the apparatus for determining a placement mode of at least one kind of objects in a multiplicity of storage areas (for example, fixtures) will be described. Some embodiments of the present disclosure include an apparatus including machine logic programmed to perform some, or all, of the operations described, above, in connection with the method embodiment of FIG. 2.

As shown in FIG. 3, apparatus 300 includes machine logic (that is, software, hardware and/or firmware) used in determining the placement mode of at least one kind of objects in the multiplicity of fixtures. Apparatus 300 includes: an attraction factor determining device 301, an elasticity factor determining device 302, and a placement mode determining device 303. In this embodiment, it is assumed that there are M fixtures and N kinds of objects for convenience of description. In this embodiment, sales volume is again used as the factor upon which the attribute of attention degree of an object is based.

Attraction factor determining device 301 includes machine logic used to determine attraction factors of the M fixtures, an attraction factor of each fixture indicating a capability that the fixture attracts attention of a customer. Attraction factor determining device 301 may determine the attraction factor of the fixture through a historical sale volume of objects placed in the fixture. Specifically, in an implementation, attraction factor determining device 301 may determine the attraction factor of each fixture based on a historical sale volume of one kind of objects. For example, attraction factor determining device 301 may determine, in a case where one kind of objects are placed in the M fixtures, a ratio between a historical sale volume of this kind of objects placed in each fixture and a total historical sale volume of this kind of objects placed in the M fixtures, as the attraction factor of the fixture. In another implementation, the attraction factor determining device may determine the attraction factor of each fixture based on historical sale volumes of multiple kinds of objects (assumed to be $N_1$ kinds of objects for convenience of description, where $N_1 > 1$). For example, the attraction factor determining device may determine, for each kind of objects in the $N_1$ kinds of objects, a ratio between a historical sale volume of this kind of objects placed in each fixture and a total historical sale volume of this kind of objects placed in the M fixtures in a case where this kind of objects are placed in the M fixtures, as a partial attraction factor of the fixture. Then, the attraction factor determining device may determine the attraction factor of the fixture according to the partial attraction factors of each fixture determined for the $N_1$ kinds of objects. For example, the attraction factor determining device may calculate a weighted average of the partial attraction factors of each fixture determined for the $N_1$ kinds of objects, as the attraction factor of the fixture, with weighting coefficients of the respective partial weighting factors of the fixture may be determined flexibly as needed and/or according to the kind of the objects, etc.

The attraction factor determining device may determine the attraction factor of the fixture in other manner than to the weighted average according to the partial attraction factors of each fixture determined for the $N_1$ kinds of objects, as described above. Further, in other embodiments, when a partial attraction factor determined for a certain kind of objects in the $N_1$ kinds of objects deviates greatly from partial attraction factors determined for the other kinds of objects in the $N_1$ kinds of objects, the attraction factor determining device 301 may exclude the partial attraction factor determined for the certain kind of objects, and determine the attraction factor of the fixture in the above manner based on only the partial attraction factors determined for the other kinds of objects.

The elasticity factor determining device 302 may determine spatial elasticity factors (SEF) of the N kinds of objects, a spatial elasticity factor of each kind of objects indicating an impact of a change of the fixtures where the kind of objects are placed on an attention degree (for example, a sale volume) of the kind of objects.

Elasticity factor determining device 302 includes machine logic for determining: (i) for at least one combination in combinations (set to be P combinations for convenience of description, where $P \geq 1$) formed by any two of the M fixtures, a difference between attraction factors of two fixtures in the one combination and change amounts of historical sale volumes of the N kinds of objects when the N kinds of objects are moved between the two fixtures (that is, differences between the historical sale volumes of the N kinds of objects when they are placed in one of the two fixtures and the historical sale volumes of the N kinds of objects when they are placed in the other one of the two fixtures); and (ii) the spatial elasticity factors of the N kinds of objects according to the differences between the attraction factors determined for the P combinations and the change amounts of the historical sale volumes. In the present embodiment, a slope of a straight line obtained by fitting the differences between the attraction factors determined for the P combinations and the change amounts of the historical sale volumes may be determined, as the spatial elasticity factors of the N kinds of objects. The fitting may be a least square fitting or other types of fitting. The elasticity factor determining device may determine the spatial elasticity factors of the N kinds of objects in the particular manner described above, and a detailed description thereof is omitted here to avoid repetition.

Placement mode determining device 303 includes machine logic for determining a placement mode of the N kinds of objects in the M fixtures at least according to: (i) the attraction factors of the M fixtures; and (ii) the spatial elasticity factors of the N kinds of objects. The determination of the placement mode of the N kinds of objects in the M fixtures may include, for example, determining fixtures where the N kinds of objects are placed respectively and numbers of the objects placed in the fixtures respectively.

Specifically, placement mode determining device 303 includes machine logic for: (i) performing a regression analysis on historical data of objects placed in at least one of the M fixtures; (ii) determining a function relationship between parameters associated with the N kinds of objects and the attraction factors of the M fixtures; and (iii) the spatial elasticity factors of the N kinds of objects and the number of the N kinds of objects placed in the at least one fixture. As described above, the parameters may be sale volumes of the N kinds of objects, a revenue obtained by selling the N kinds of objects, a profit obtained by selling the N kinds of objects, or the like, and the parameters can be selected according to an object of determining the placement mode of the objects. Placement mode determining device 303 includes machine logic for determining the fixtures where the N kinds of objects are placed respectively and the numbers of the N kinds of objects placed in the fixtures respectively according to the function relationship. Specifically, placement mode determining device 303 includes machine logic for determining: (i) the storage areas (fixtures) where the N kinds of objects are respectively placed respectively; and (ii) the numbers of the N kinds of objects placed in the storage areas respectively when the parameters associated with the N kinds of objects are maximum in a case where any constraint condition(s) are satisfied, according to the functional relationship. The constraint condition may include one or more of a total number of each kind of objects to be placed, numbers of each kind of objects that can be accommodated by the respective fixtures, and a user-specified constraint condition. The placement mode determining device 303 may determine the placement mode of the N kinds of objects in the M fixtures in the manner described, above, in the discussion of FIG. 2.

Likewise, with the above apparatus according to the embodiment of the present disclosure, the placement mode of the objects on a shelf can be automatically determined based on a correlation between the multiplicity of fixtures and the attention degrees (for example sale volumes) of the objects and the impact of the change of positions for placing the objects on the attention degrees of the objects, so as to determine the reasonable placement mode of the objects scientifically and efficiently, reduce a probability of making errors when the placement mode of the objects is determined, and improve utilization efficiency of the storage areas.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an object of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   determining attraction factors respectively corresponding to a plurality of fixtures located on a plurality of shelves in a store, with each given attraction factor indicating a degree of shopper attention that customers tend to pay to items for sale in the fixture corresponding to the given attraction factor;
   determining a first fixture from the plurality of fixtures for a first kind of item for sale in a first storage area of the plurality of storage areas based, at least in part, on the attraction factors respectively corresponding to the plurality of storage areas;
   receiving a plurality of items of the first kind; and
   stocking the plurality of items of the first kind in the first fixture;
   wherein the determination of each given attraction factor includes calculating a ratio between: (i) an amount of attention historically observed to be paid to items placed in the fixture respectively corresponding to the given attraction factor, and (ii) a total amount of attention historically paid to all of the fixtures of the plurality of fixtures.

2. The method of claim 1 further comprising:
   determining a first spatial elasticity factor for the first kind of item, with the first spatial elasticity factor indicating how strongly a choice of fixture used to display items of the first kind is correlated with a degree of attention a customer will tend to pay to the first kind of object;
   wherein the determination of the first fixture for stocking items of the first kind is based, at least in part, on the first spatial elasticity factor.

3. A store including:
   a plurality of fixtures for stocking with items of various kinds for sale to customers, with the plurality of fixtures including a first fixture; and
   a plurality of items of a first kind, with items of the first kind being stocked in the first fixture;
   wherein the first fixture is selected for stocking of the plurality of items of the first type based upon the following method:
      determining attraction factors respectively corresponding to the plurality of fixtures, with each given attraction factor indicating a degree of shopper attention that customers tend to pay to items for sale in the fixture corresponding to the given attraction factor, with the determination of each given attraction factor including calculating a ratio between: (i) an amount of attention historically observed to be paid to items placed in the fixture respectively corresponding to the given attraction factor, and (ii) a total amount of attention historically paid to all of the fixtures of the plurality of fixtures, and
      determining the first fixture from the plurality of fixtures for stocking the plurality of items of the first kind based, at least in part, on the attraction factors respectively corresponding to the plurality of storage areas.

* * * * *